(12) United States Patent
Foelster et al.

(10) Patent No.: US 6,688,669 B2
(45) Date of Patent: Feb. 10, 2004

(54) MOTOR VEHICLE HAVING A FOLDING ROOF WHICH CAN BE OPENED

(75) Inventors: Thomas Foelster, Grafenau (DE); Juergen Schrader, Weil im Schoenbuch (DE); Reiner Wesenick, Langenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/207,017

(22) Filed: Jul. 30, 2002

(65) Prior Publication Data
US 2003/0025349 A1 Feb. 6, 2003

(30) Foreign Application Priority Data

Jul. 31, 2001 (DE) .......................................... 101 37 048

(51) Int. Cl.$^7$ .................................................. B60J 7/20
(52) U.S. Cl. ........................... 296/107.01; 296/107.08; 296/37.16
(58) Field of Search ....................... 296/107.08, 107.01, 296/136, 37.1, 37.5, 37.16, 124, 216.02, 76; 160/DIG. 2

(56) References Cited

U.S. PATENT DOCUMENTS

| | | | | |
|---|---|---|---|---|
| 4,536,025 A | * | 8/1985 | Yamawaki et al. | 296/37.16 |
| 4,969,679 A | * | 11/1990 | Eyb | 296/124 |
| 5,649,733 A | * | 7/1997 | Seel et al. | 296/37.5 |
| 6,386,615 B2 | * | 5/2002 | Neubrand et al. | 296/107.08 |
| 6,419,308 B1 | * | 7/2002 | Corder et al. | 296/216.02 |
| 6,425,621 B2 | * | 7/2002 | Miklosi et al. | 296/108 |

FOREIGN PATENT DOCUMENTS

| | | |
|---|---|---|
| DE | 1-197117 | 8/1989 |
| DE | 19541168 C1 | 2/1997 |
| DE | 19636027 C1 | 12/1997 |
| DE | 19706418 A1 | 8/1998 |
| DE | 19542906 C1 | 11/1998 |
| DE | 19845154 C2 | 10/2000 |

\* cited by examiner

Primary Examiner—Joseph D. Pape
Assistant Examiner—G. Blankenship
(74) Attorney, Agent, or Firm—Crowell & Moring LLP (57) ABSTRACT

A motor vehicle has a folding roof which can be opened and lowered into a rear storage space. Partitioning of the rear storage space into a folding-top space and a residual luggage space is provided by a separating arrangement which includes a dimensionally stable covering element that can be shifted vertically from a use position into a non-use position when the folding top is stored. The covering element extends over a rear sub-length of the separating arrangement and can be displaced forwards into the non-use position shortening the length of the separating arrangement.

28 Claims, 8 Drawing Sheets

MOTOR VEHICLE HAVING A FOLDING ROOF WHICH CAN BE OPENED

This application claims the priority of German application 101 37 048.2, filed Jul. 31, 2001, the disclosure of which is expressly incorporated by reference herein.

The present invention relates to a motor vehicle having a folding roof which can be opened and lowered into a rear storage space, and a separating arrangement partitioning the rear storage space into a folding-top space and a residual luggage space, with the separating arrangement including a dimensionally stable covering element which can be shifted vertically from a use position into a non-use position when the folding roof is stored. The invention also relates to a process of storing the folding roof.

A motor vehicle of this type having a folding roof which can be opened and lowered into a rear storage space can be inferred as already being known from German patent publication DE 198 45 154 C2. This document furthermore envisages partitioning the rear storage space into a folding-top space and a residual luggage space by means of a separating arrangement which comprises a dimensionally stable, flat covering element. This covering element can be shifted vertically from a use position into a non-use position when the folding top is stored.

One object of the present invention is the object of providing a motor vehicle of the type mentioned at the beginning in which the residual luggage space can be loaded and unloaded in an improved manner.

This object is achieved according to the invention by an arrangement in which the covering element extends over a rear sub-length of the separating arrangement and can be displaced forwards into the non-use position, shortening the length of the separating arrangement. Advantageous refinements of the invention can be gathered from the claims.

In a motor vehicle according to the invention, the covering element which extends over a rear sub-length of the separating arrangement, as seen in the longitudinal direction of the vehicle, can be displaced forwards into the non-use position, shortening the length of the separating arrangement. As a result, a relatively large loading opening is advantageously produced for loading and unloading the residual luggage space.

In order to utilize the space for the residual luggage space particularly well, in an advantageous refinement of the invention, the covering element is designed as a covering hood having wings which are angled laterally downwards.

A parallelogram linkage, which is arranged in each case laterally, has proven successful for shifting the covering hood forwards and upwards. It is possible for the path of displacement to be influenced in a simple manner by the selection of the length of the parallelogram lever.

The reduction in the length of the separating arrangement can be compensated for in a simple manner by means of a second covering element formed by a foldable web of material.

Further advantages, features and details of the invention emerge from the following description and with reference to the drawings.

DETAILED DESCRIPTION OF THE INVENTION

Figure 1:
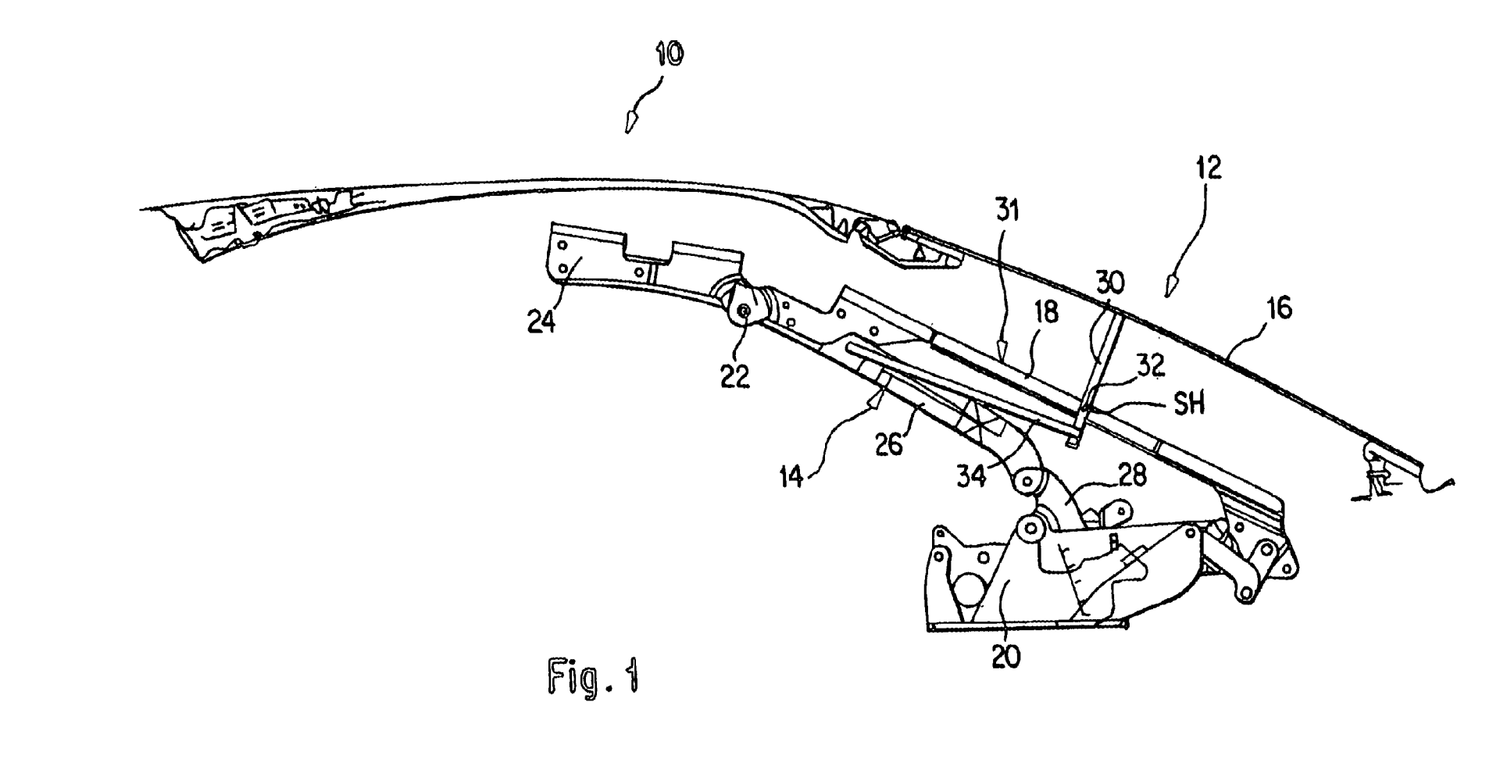
FIG. 1 shows a schematic sectional view of the closed folding roof along the central longitudinal plane of the motor vehicle according to the invention, together with the front and rear roof parts connected to each other in an articulated manner and the main link arrangement for opening the roof.

FIG. 1 illustrates, in a schematic sectional view along the central longitudinal plane, the folding roof, which can be opened, of a motor vehicle in the closed state. The folding roof comprises front and rear roof parts 10, 12 which are connected to each other in an articulated manner, the front side of the front roof part 10 adjoining a windscreen frame (not shown) and the rear side of the rear roof part 12 ending level with the tailgate of the motor vehicle. The front and rear roof parts 10, 12, controlled by means of a main link arrangement 14 (explained in greater detail below), can be shifted between the closing position (shown here) and a storage position (shown in FIG. 4) in a rear storage space. The rear roof part 12 comprises, as essential parts, a fixed rear window 16 made of glass or plastic and lateral C-pillars 18. The rear window 16 is mounted (in a manner also described below) on the lateral roof pillars 18 in a manner such that it can pivot about a pivot axis SH running in its central region in the transverse direction of the vehicle. At the rear end, the lateral C-pillars 18 are connected to a main bearing 20, in each case in an articulated manner, while at their front ends they each have a main pivot point 22 on which a hinge 24 for the front roof part 10 is also articulated. Articulated on that end of the hinge 24 which faces away from the main pivot point 22 is an end, which is concealed in FIG. 1, of a main link 26 of the main link arrangement 14, the other end of which is connected to the main bearing 20 via an intermediate lever 28. The two main links 26 run laterally in the vicinity of the C-pillars. The rear window 16 is rigidly connected fixedly to a lever 30 of a rotational drive 31, the lever protruding inwards in the central region of the rear window 16 and being connected pivotably to the C-pillar 18 in each case in an articulated manner via a pivot point 32. At its end facing the pivot point 32, the lever 30 is connected fixedly to a restraint lever 34 which is articulated in turn by its end facing away from the lever 30 on the associated main link 26.

Figure 2:
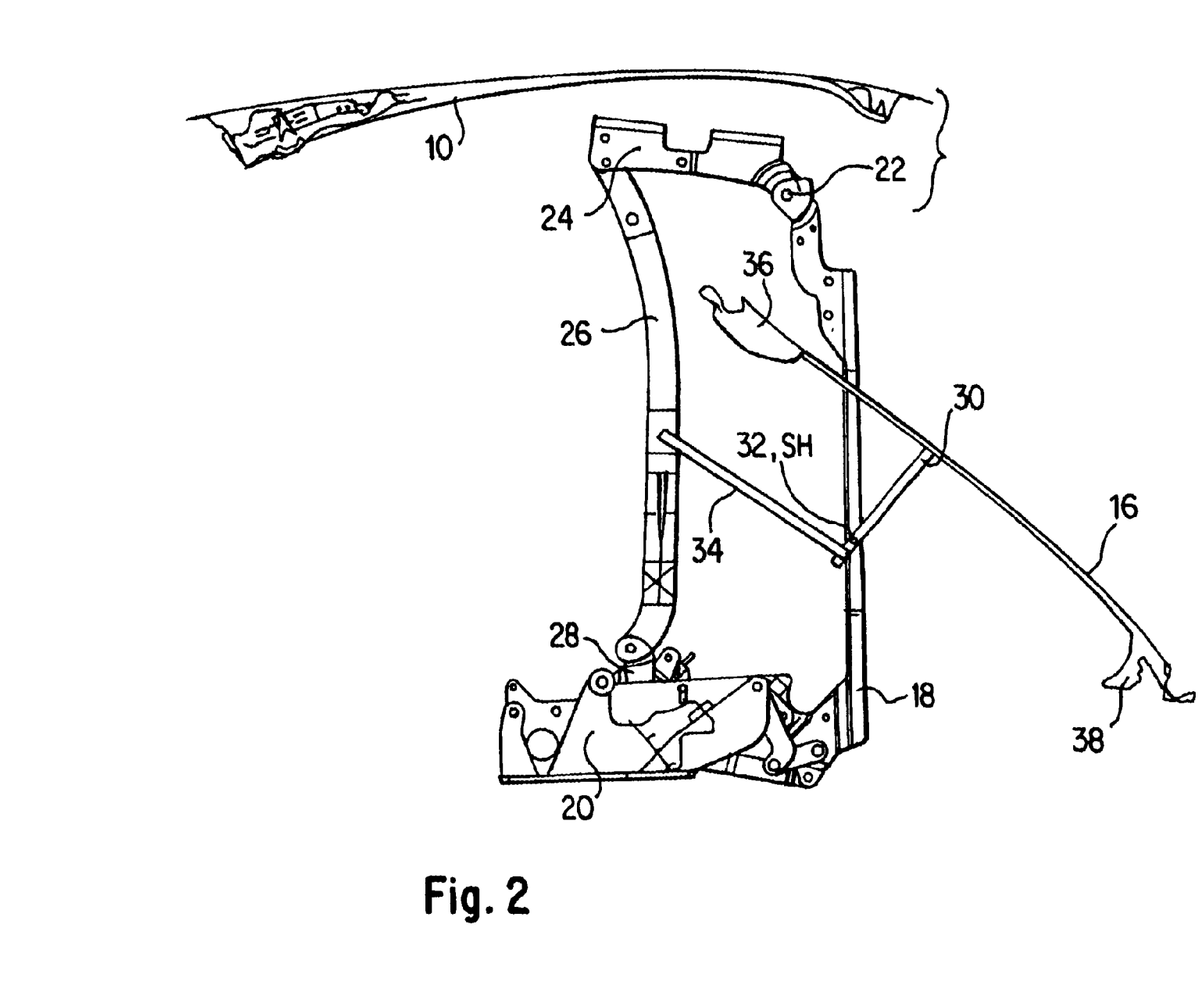
FIGS. 2 and 3 show schematic sectional views of the folding roof during first and second stages of a process of storing the roof in a rear storage space.
Figure 3:
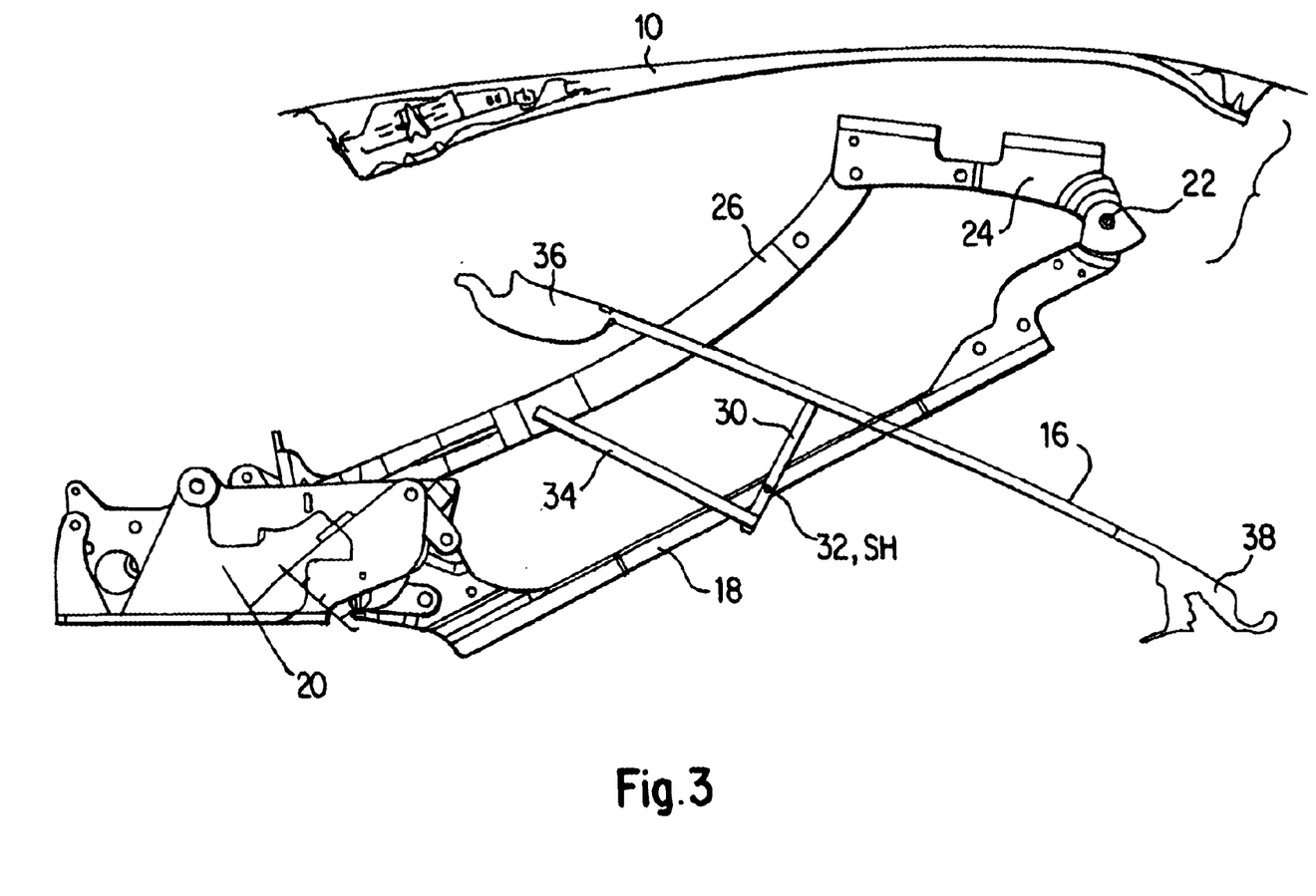
Figure 4:
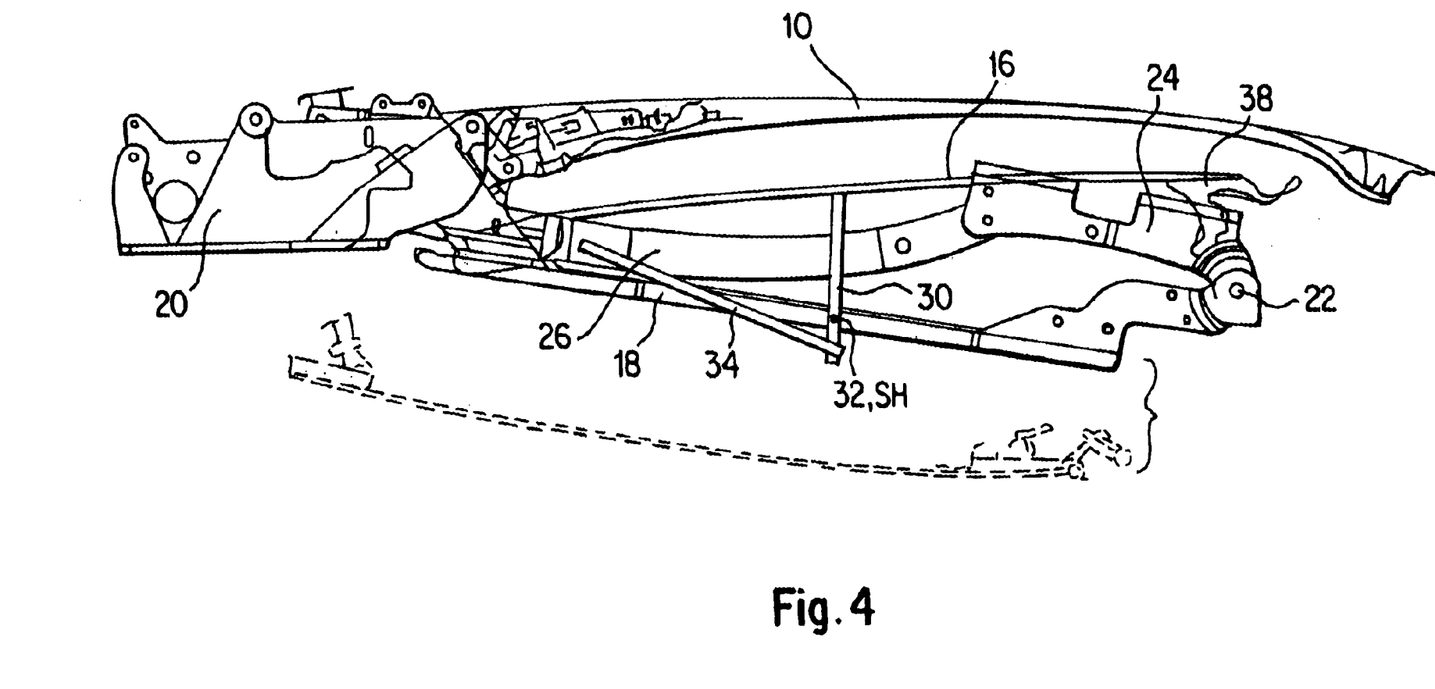
FIG. 4 shows a schematic sectional view of the folding roof in a stored state.

From FIGS. 2 to 4, three stages of the storing process of the roof in the rear storage space 25 (shown in FIGS. 5 to 9) can be seen, in each case in a schematic sectional view. With the main link 26 being driven via the intermediate lever 28 by a driving device (not illustrated in greater detail), at the same time the rear window 16 is also moved in a restrained manner via the restraint lever 34 and the lever 30 of the rotational drive 31. Owing to the above-described arrangement of the lever and points of articulation, the rear window 16 is stored separately from the C-pillars 18 by means of the rotation drive 31, the storing movement being restrained in such a manner that the rear window 16 does not carry out any rotational movement to the rear, but merely a pivoting movement downwards and to the rear about the pivot axis SH running in the transverse direction of the vehicle in the central region of the rear window 16, the rear window 16 basically maintaining its positional direction. In other words: A front and upper seal 36 remains at the front and a rear seal 38 remains at the rear.

As can be seen from FIG. 4, in the stored state, the front roof part 10 and the rear window 16 therefore lie in a space-saving manner curved in the same direction or with the same curvature in the rear region of the vehicle. In FIG. 4, part of a rear window is additionally drawn in, in dashed lines, in a position which it would have in the case of a movement according to the prior art.

Figure 5:
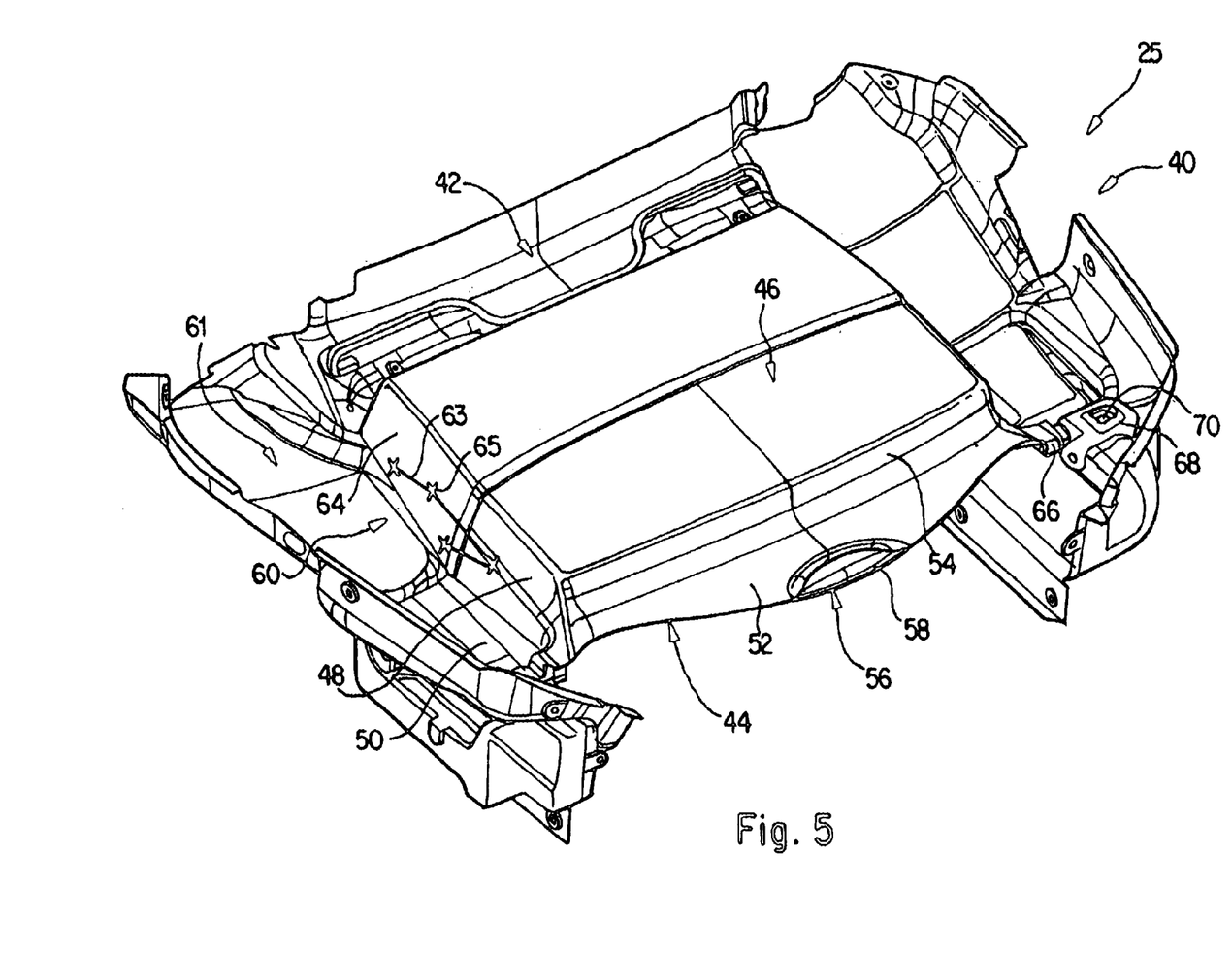
FIG. 5 shows a schematic perspective view of the rear storage space which is partitioned by means of a separating arrangement into a folding-top space and a residual luggage space, the separating arrangement being shown in a use position with the folding top stored.
Figure 6:
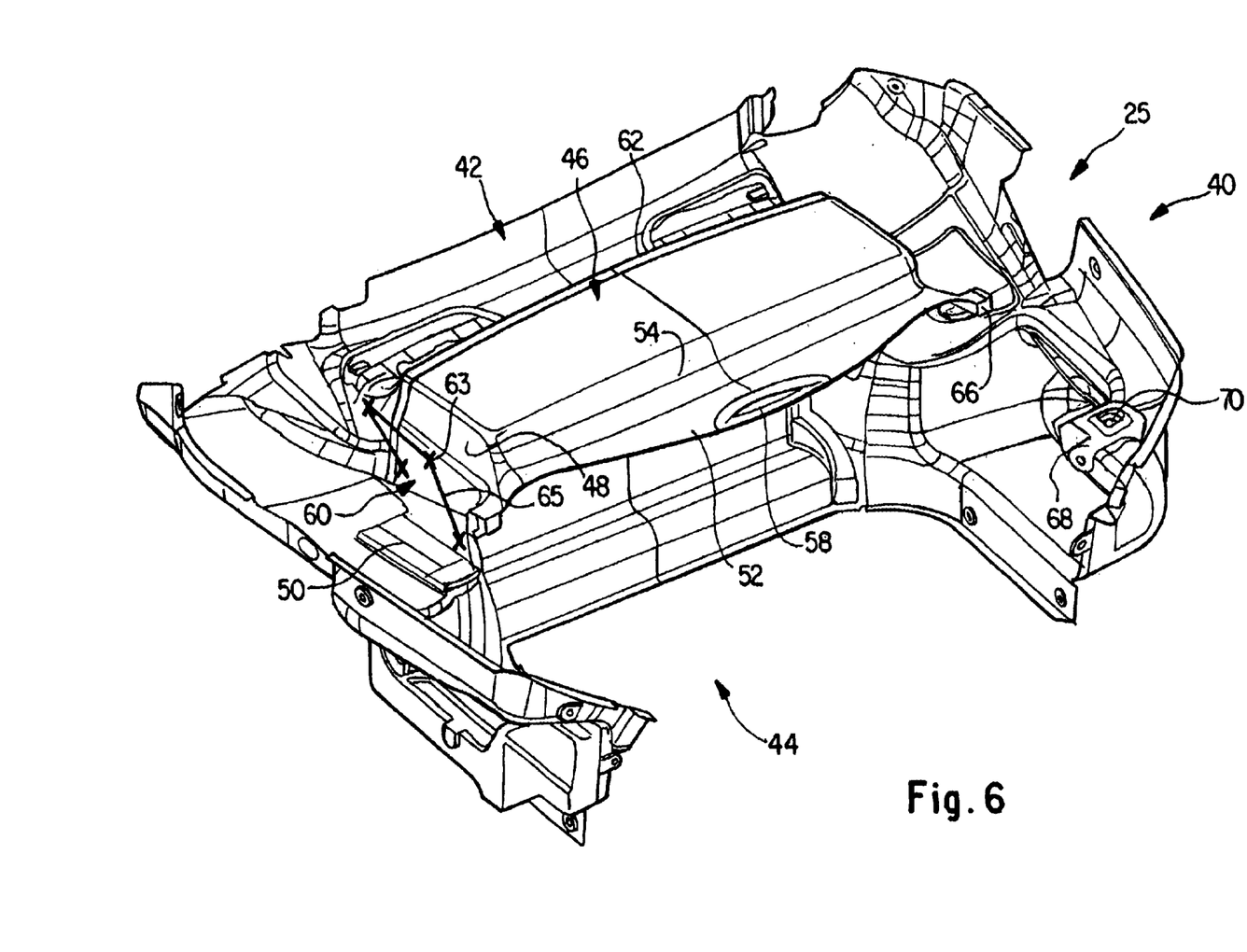
FIG. 6 shows a schematic perspective view of the separating arrangement in a non-use position with a rear covering hood displaced forwards.

FIGS. 5 and 6 show, in a schematic perspective view, the interior soft trim of the rear storage space 25 of the motor vehicle together with a separating arrangement 40 which is arranged therein. The separating arrangement is illustrated in its use position in FIG. 5 and in its non-use position in FIG. 6. According to FIG. 5, the separating arrangement 40 partitions the rear storage space 25 into a folding-top space 42 and a residual luggage space 44. The separating arrangement 40 comprises a dimensionally stable covering element in the form of a covering hood 46 which here is formed of plastic and has wings 48 which are angled laterally downwards and run in the longitudinal direction of the vehicle. In other words, the covering hood 46 is curved in the same manner as the rear window 16 and the front roof part 10 in order to increase the residual luggage space 44. As an alternative, a flat design of the covering hood 46 would also be conceivable. The covering hood 46 extends over a rear sub-length of the separating arrangement 40, which corresponds here approximately to half of the length of the rear storage space 25. Laterally protruding sections 50 are arranged at the lower end of the wings 48. Towards the rear end region 52, the covering hood 46 has a transition region 54 which is angled downwards. In this case, the end region 52 and the laterally protruding sections 50 lie approximately level. The rear end region 52 has an approximately horizontal profile and is passed through here by a centrally arranged gripping arrangement 56 which comprises an oval gripping hole. That edge zone of the end region 52 which is adjacent to the gripping hole 56 is provided with a plastic border 58. The covering hood 46 is controlled in movement via two parallelogram linkages 60 which are arranged laterally in each case and of which only the bearing points 63 and the parallelogram levers 65 can be seen schematically in FIGS. 5 and 6. The parallelogram linkages 60 are fastened to the lining of the rear storage space 25. Via the parallelogram linkages 60, the covering hood 46 can be shifted vertically from the use position shown in FIG. 5 forwards into the non-use position shown in FIG. 6 shortening the length of the separating arrangement 40.

In the front length region, the separating arrangement 40 has a second covering element 62 which consists here of a foldable web of material. As an alternative, a dimensionally stable design of the covering element 62 would also be conceivable. In this case, the front end of the rear covering element 46 is connected to the rear end of the second covering element 62. The front end of the web of material 62 is—as will be explained in greater detail with reference to FIG. 9—fastened to the interior lining of the rear storage space 25. The second covering element 62 comprises wings 64 which are angled laterally downwards and are matched to the wings 48 of the rear covering element 46. In other words, the second covering element 62 is adapted in its cross section approximately to that of the covering hood 46. The wings 48 of the covering hood 46 and the wings 64 of the covering element 62 form, in each case together with opposite wall regions of a lining of the rear storage space, a receiving shaft 61 for the lateral folding-top pillars 18 of the folding roof. The separating arrangement 40 can be designed together with soft trim parts of the rear storage space 25 as a preassemblable constructional unit.

Figure 7:
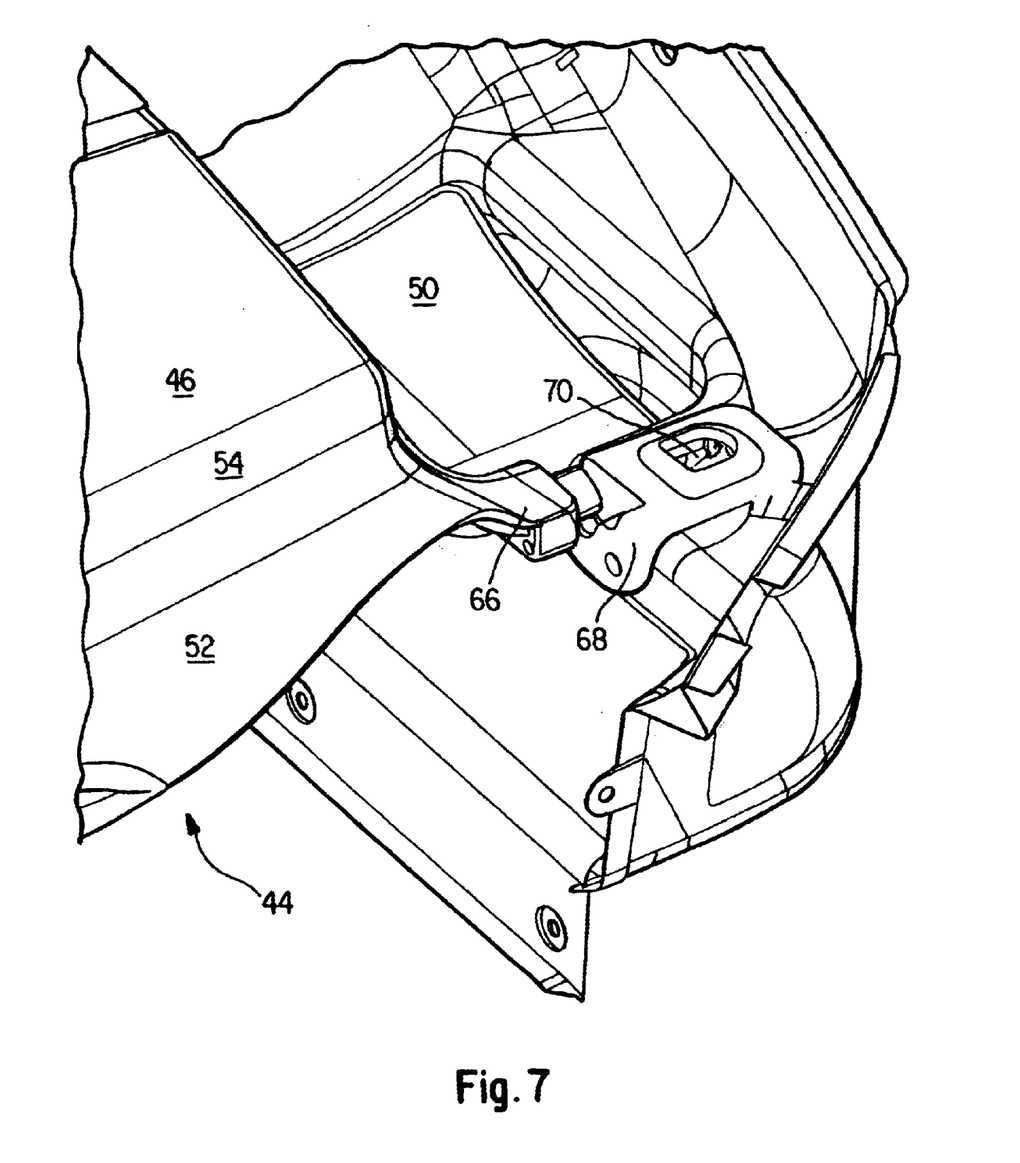
FIG. 7 shows an enlarged, schematic perspective view of the rear, right corner regions of the covering hood.

As can be seen, in particular, in an overall view using FIG. 7, in which an enlarged, schematic perspective view of the rear, right corner region of the covering hood 46 is shown, there protrude from the covering hood 46 in the rear corner regions laterally projecting retaining arms 66 which can be fitted into associated receiving brackets 68. In this way, the covering hood 46 is fixed in the use position. In addition, each of the receiving brackets 68 has a stop buffer 70 for the folding roof. A spring store or the like can be arranged on the parallelogram linkages 60, with the result that the covering hood 46 is held in the receiving brackets 68 counter to the spring force of this store.

Figure 8:
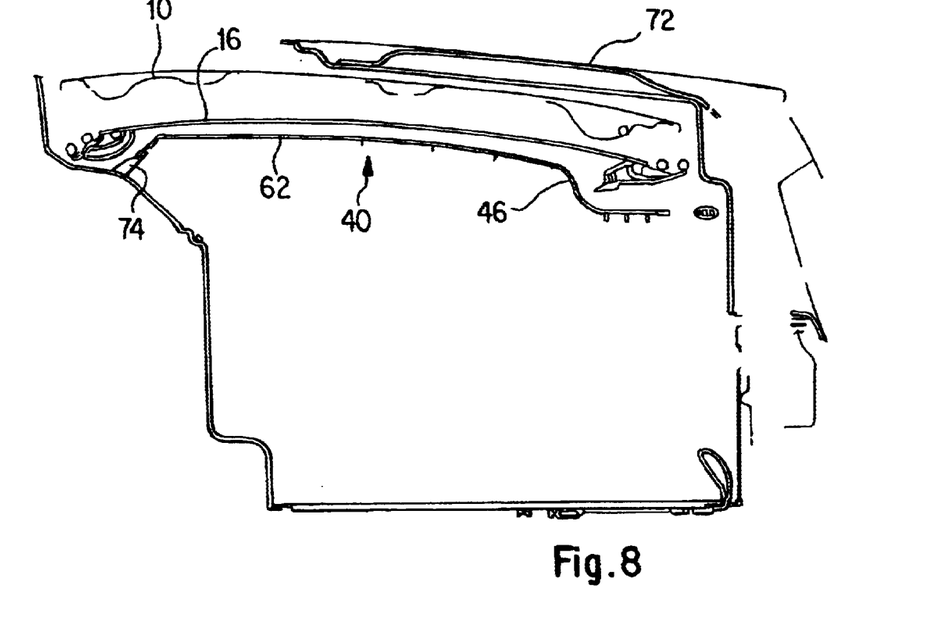
FIGS. 8 and 9 show schematic sectional views of the rear storage space along the central longitudinal plane of the motor vehicle according to the invention.
Figure 9:
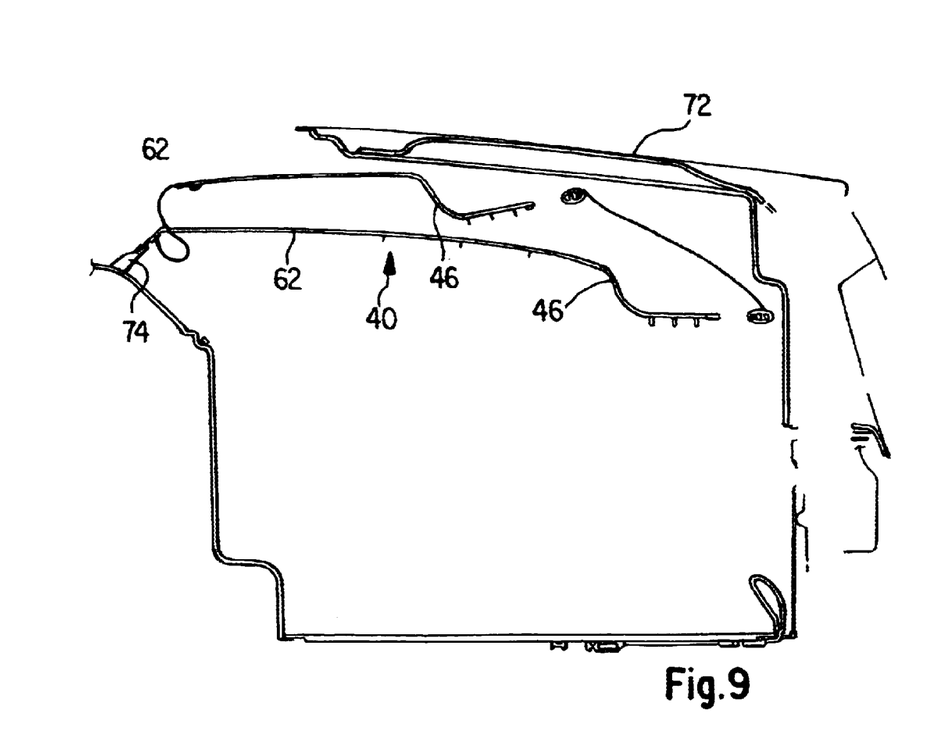

FIGS. 8 and 9 show schematic sectional views along the central longitudinal plane of the motor vehicle according to the invention of the rear storage space 25 which is closed at the top by a rear-space lid 72. In FIG. 8, the front roof part 10 and the rear window 16, which is arranged between the roof pillars 18, is stowed in the stored state below the rear-space lid 72 in a space-saving manner curved in the same direction, the separating arrangement 40 being shown together with the front covering element 62 and the rear covering hood 46 in the use position. It can additionally be seen that the front covering element 62 is fastened by its front end to a lining part 74 of the rear storage space 25. FIG. 9 shows the separating arrangement 40 together with the front covering element 62 and the rear covering hood 46 both in the use position and in the non-use position in which the covering hood 46 is shifted vertically forwards and upwards shortening the length of the separating arrangement 40. When the covering hood 46 is moved back into the non-use position, the covering element 62, which is in the form of a web of material, is transferred from its stretched state into a folded state. The covering element 62 may also be of dimensionally rigid design, in which case the latter is then not connected fixedly at its front end to the covering hood 46. The covering hood 46 is then pivoted over the covering element 62 into the non-use position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:
1. A motor vehicle comprising:
   a folding roof which can be opened and which can be lowered into a rear storage space, and
   a separating arrangement partitioning the rear storage space into a folding-top space and a residual luggage space, the separating arrangement comprising a dimensionally stable covering element which can be shifted vertically from a use position into a non-use position when the folding roof is stored,
   wherein the covering element extends over a rear sub-length of the separating arrangement and can be displaced forwards via linkages having bearing points and levers into the non-use position, shortening the length of the separating arrangement.

2. A motor vehicle comprising:
a folding roof which can be opened and which can be lowered into a rear storage space, and
a separating arrangement partitioning the rear storage space into a folding-top space and a residual luggage space, the separating arrangement comprising a dimensionally stable covering element which can be shifted vertically from a use position into a non-use position when the folding roof is stored,
wherein the covering element extends over a rear sub-length of the separating arrangement and can be displaced forwards into the non-use position, shortening the length of the separating arrangement, and
wherein the covering element is a covering hood having wings angled laterally downwards.

3. The motor vehicle according to claim 2, wherein the wings of the covering hood form, in each case together with opposite wall regions of a lining of the rear storage space, a receiving shaft for lateral folding-top pillars of the folding roof.

4. The motor vehicle according to claim 2, wherein the covering hood has a transition region to a lower end region, which transition region is angled downwards.

5. The motor vehicle according to claim 4, wherein the lower end region has an approximately horizontal profile and a gripping arrangement.

6. The motor vehicle according to claim 5, wherein the gripping arrangement comprises an oval gripping hole, and wherein an edge zone of the lower end region which is adjacent to the gripping hole is provided with a border.

7. The motor vehicle according to claim 2, wherein the covering hood has, in rear corner regions of the covering hood, laterally protruding retaining arms which can be fitted into associated receiving brackets.

8. The motor vehicle according to claim 7, wherein the receiving brackets are in each case provided with a stop buffer for the folding roof.

9. The motor vehicle according to claim 2, wherein the covering hood is controlled in movement via lateral parallelogram linkages.

10. The motor vehicle according to claim 2, wherein the separating arrangement has a second covering element in a front length region.

11. The motor vehicle according to claim 10, wherein the second covering element is a foldable web of material.

12. The motor vehicle according to claim 11, wherein a rear end of the second covering element is connected to the front end of the covering hood.

13. The motor vehicle according to claim 10, wherein the second covering element has wings which are angled laterally downwards and are matched to the wings of the covering hood.

14. A motor vehicle comprising:
a folding roof which can be opened and which can be lowered into a rear storage space, and
a separating arrangement partitioning the rear storage space into a folding-top space and a residual luggage space, the separating arrangement comprising a dimensionally stable covering element which can be shifted vertically from a use position into a non-use position when the folding roof is stored,
wherein the covering element extends over a rear sub-length of the separating arrangement and can be displaced forwards into the non-use position, shortening the length of the separating arrangement, and
wherein the separating arrangement is designed together with soft trim parts of the rear storage space as a preassemblable constructional unit.

15. A process by which a residual luggage space can be loaded and unloaded while storing a folding roof of a motor vehicle which can be opened and which can be lowered into a rear storage space which is partitioned into a folding-top space and the residual luggage space by a separating arrangement comprising:
shifting a dimensionally stable covering element vertically from a use position into a non-use position when the folding roof is stored, and
displacing the covering element which extends over a rear sub-length of the separating arrangement forwards via linkages having bearing points and levers into the non-use position thereby shortening the length of the separating arrangement.

16. A process by which a residual luggage space can be loaded and unloaded while storing a folding roof of a motor vehicle which can be opened and which can be lowered into a rear storage space which is partitioned into a folding-top space and a residual luggage space by a separating arrangement comprising:
shifting a dimensionally stable covering element vertically from a use position into a non-use position when the folding roof is stored, and
displacing the covering element which extends over a rear sub-length of the separating arrangement forwards into the non-use position thereby shortening the length of the separating arrangement,
wherein the covering element is a covering hood having wings angled laterally downwards.

17. The process according to claim 16, wherein the wings of the covering hood form, in each case together with opposite wall regions of a lining of the rear storage space, a receiving shaft for lateral folding-top pillars of the folding roof.

18. The process according to claim 16, wherein the covering hood has a transition region to a lower end region, which transition region is angled downwards.

19. The process according to claim 18, wherein the lower end region has an approximately horizontal profile and a gripping arrangement.

20. The process according to claim 19, wherein the gripping arrangement comprises an oval gripping hole, and wherein an edge zone of the lower end region which is adjacent to the gripping hole is provided with a border.

21. The process according to claim 16, wherein the covering hood has, in rear corner regions of the covering hood, laterally protruding retaining arms which can be fitted into associated receiving brackets.

22. The process according to claim 21, wherein the receiving brackets are in each case provided with a stop buffer for the folding roof.

23. The process according to claim 16, wherein the covering hood is controlled in movement via lateral parallelogram linkages.

24. The process according to claim 16, wherein the separating arrangement has a second covering element in a front length region.

25. The process according to claim 24, wherein the second covering element is a foldable web of material.

26. The process according to claim 25, wherein a rear end of the second covering element is connected to the front end of the covering hood.

27. The process according to claim 24, wherein the second covering element has wings which are angled laterally downwards and are matched to the wings of the covering hood.

28. A process by which a residual luggage space can be loaded and unloaded while storing a folding roof of a motor vehicle which can be opened and which can be lowered into a rear storage space which is partitioned into a folding-top space and a residual luggage space by a separating arrangement comprising:

shifting a dimensionally stable covering element vertically from a use position into a non-use position when the folding roof is stored, and     displacing the covering element which extends over a rear sub-length of the separating arrangement forwards into the non-use position thereby shortening the length of the separating arrangement, wherein the separating arrangement is designed together with soft trim parts of the rear storage space as a preassemblable constructional unit.

\* \* \* \* \*